United States Patent
Krompholz et al.

(10) Patent No.: US 9,314,035 B2
(45) Date of Patent: Apr. 19, 2016

(54) APPARATUS FOR FILLING TUBULAR CASINGS

(71) Applicant: VEMAG Maschinenbau GmbH, Verden/Aller (DE)

(72) Inventors: Harry Krompholz, Dorversen-Stedorf (DE); Jan-Nils Hagedorn, Verden (DE); Alexander Lewin, Verden (DE)

(73) Assignee: VEMAG Maschinenbau GmbH, Verden/Aller (DE)

(*) Notice: Subject to any disclaimer, the term of this patent is extended or adjusted under 35 U.S.C. 154(b) by 0 days.

(21) Appl. No.: 14/531,321

(22) Filed: Nov. 3, 2014

(65) Prior Publication Data
US 2015/0245627 A1 Sep. 3, 2015

(30) Foreign Application Priority Data

Nov. 13, 2013 (DE) ...................... 20 2013 010 285 U

(51) Int. Cl.
*A22C 11/00* (2006.01)
*A22C 11/02* (2006.01)

(52) U.S. Cl.
CPC .............. *A22C 11/02* (2013.01); *A22C 11/0209* (2013.01); *A22C 11/0218* (2013.01); *A22C 11/0263* (2013.01)

(58) Field of Classification Search
CPC ..... A22C 11/00; A22C 11/001; A22C 11/003
USPC .......... 452/21–26, 30–35, 46–48, 51
See application file for complete search history.

(56) References Cited

U.S. PATENT DOCUMENTS

| 3,964,128 | A | * | 6/1976 | Townsend et al. ............... 452/38 |
| 4,091,505 | A | * | 5/1978 | Muller et al. ................... 452/47 |
| 4,602,402 | A | * | 7/1986 | Schnell .......................... 452/31 |
| 4,624,029 | A | * | 11/1986 | Tomczak et al. ................ 452/24 |
| 4,893,377 | A | * | 1/1990 | Evans et al. ..................... 452/34 |

(Continued)

FOREIGN PATENT DOCUMENTS

| AU | 2740792 A | 5/1993 |
| DE | 102007061119 A1 | 6/2009 |
| EP | 0539580 A1 | 5/1993 |
| EP | 1260143 A1 | 11/2002 |
| EP | 2227963 A1 | 9/2010 |

(Continued)

OTHER PUBLICATIONS

German Patent and Trade Mark Office, Search Report issued in Application No. 20 2013 010 285.3 dated Jul. 21, 2014.

*Primary Examiner* — Richard Price, Jr.
(74) *Attorney, Agent, or Firm* — Wood, Herron & Evans, LLP

(57) ABSTRACT

Apparatus for filling tubular casings with a pasty material, in particular gathered-together sausage cases with sausagemeat. The apparatus includes at least one filling tube which is drivable and rotatable about its longitudinal axis and onto which a casing which can be filled with a material can be drawn, wherein an end of the filling tube is rotatably moveably mounted to a receiving portion and associated with the opposite open end is a sausage case braking unit which can be brought into operative relationship with a casing which has been drawn over the filling tube. Arranged on the receiving portion is a support device which has a support element for the filling tube, that is arranged at a spacing (x) relative to the receiving portion in the longitudinal direction of the filling tube, wherein the support element is adapted to carry transverse forces acting on the filling tube.

21 Claims, 3 Drawing Sheets

(56) References Cited

U.S. PATENT DOCUMENTS

2001/0011005 A1* 8/2001 Bolzacchini .................... 452/22
2010/0330891 A1* 12/2010 Baechtle et al. ................ 452/36

FOREIGN PATENT DOCUMENTS

EP 2266409 A1 12/2010
JP 2004000152 A 1/2004

* cited by examiner

APPARATUS FOR FILLING TUBULAR CASINGS

BACKGROUND

The present invention concerns an apparatus for filling tubular casings with a pasty material, in particular gathered-together sausage cases with sausagemeat and a filling machine for producing sausages of pasty material, in particular sausagemeat.

Apparatuses for filling tubular casings are used, in particular, on filling machines for producing sausage strings, by means of which a pasty material like sausagemeat or the like is introduced portion-wise or in the form of portions of a predetermined amount into tubular casings of plastic or natural sausage skin. During the filling operation, the filled casing is divided off or twisted off at predetermined spacings between the individual filling steps, thereby producing sausage string portions which can be separated from each other, the portions being as far as possible of the same length and the same weight, which can then be separated from each other. The portions, which have been separated from each other, are then cut off to form the individual sausages, which inter alia are passed for further processing to a packaging machine.

Before the operation of filling the tubular casing, the tubular casing is drawn onto the filling tube of a filling device, in which case the tubular casing whose actual length corresponds to a multiple of the length of the filling tube is usually already concertinaed or gathered together so that the gathered casing, also referred as the gathered sausage case, is shorter than the filling tube. The gathered casings can be of different diameters, also referred to as calibers. The pasty material is pushed through the filling tube into the tubular casing, which is closed at one end, by means of a conveyor device, which is preferably connected upstream of the filling device, like for example a pump, in particular an adjustable vane pump or a conveyor screw. By virtue of the material introduced into the casing, the casing is gradually pulled off the open end of the filling tube. When a presettable amount or portion of the material has been introduced into the casing, the filling process is briefly interrupted and, in order to separate the introduced portion from the following portion, the casing portion which is disposed on the filling tube is rotated by means of the filling tube, which is mounted rotatably about its longitudinal axis. For that purpose, the filling tube is connected to a drive arranged on the receiving portion for carrying the filling tube. The filling tube is rotated about its longitudinal axis together with the gathered casing portion which has been pulled onto the filling tube and thus, after an amount of sausagemeat has been delivered into the tubular casing, this results in the production of a twist-off or constriction location. After the twisting-off operation has been effected, in which case the filling tube is rotated through a presettable angular amount, a predetermined amount of the material to be introduced is in turn pressed through the filling tube into the tubular casing and thus the casing is again pulled off the filling tube by a certain distance. After the material has been introduced, the twisting-off operation is started afresh and, with the continuous succession of the above-described process steps, this procedure results in a sausage string with individual string portions which can separated from each other.

To ensure that the sausage case is reliably also rotated on the filling tube, sausage case entrainment devices or sausage case braking units are provided, in particular at the open end of the filling tube, which press the casing onto the filling tube. In that respect, the sausage case braking unit has a rotatably mounted braking ring which is intended to afford a frictional or positively locking connection between the outer peripheral surface of the filling tube and a portion of the gathered sausage case which has been drawn there onto, and thus transmits the rotary movement produced by the filling tube to the casing portion which has been pulled thereover. At predetermined time intervals, the tubular casing which has been drawn onto the filling tube is used up and a fresh, gathered tubular casing has to be pulled onto the filling tube. For that purpose, the sausage case braking unit is to be moved away from the open end of the filling tube, by the sausage case braking unit being pulled away from the filling tube in the longitudinal direction thereof. A fresh, gathered tubular casing is pushed or pulled onto the filling tube from the open end thereof by means, for example, of a sausage case gripping device and then the sausage case entrainment device or sausage case braking unit is brought into contact again with the front open end of the filling tube, whereby the tubular casing is pressed onto the filling tube at least in the region of the tip thereof.

EP 2040556 B1 discloses a filling apparatus of the above-indicated general kind, having a filling tube onto which tubular casings are pulled or pushed at regular time intervals. To reduce the time intervals between the change operations and thus to improve the economy of the filling procedure, filling tubes are used which are of large lengthwise dimensions (minimum lengths) in order to be able to receive tubular casing portion of corresponding length. In that way, a predetermined minimum number of sausage string portions which are separated from each other can be produced, without changing the casing. From time to time, when pulling on the tubular casings comprising for example collagen or plastic material or when using natural sausage skins, or when the sausage case braking unit is again brought into contact with the casing, at the open end of the filling tube, the relatively long filling tube can suffer bending deformation. As a consequence of this, the bent filling tube can be caused to swing or oscillate during the operations of twisting off between the adjacent sausage string portions in the subsequent filling operation, and this can thus lead to the tubular casing being incorrectly loaded with pasty material. It can happen that the filling tubes are subjected to bending deformation in the casing change operation in such a way that in further operation of the filling apparatus the filling tubes can no longer be used and have to be replaced.

SUMMARY

With that background in mind, an object of the present invention is to improve an apparatus for filling tubular casings, such as to ensure improved process reliability during operation of the filling apparatus.

The embodiments of the invention concern an apparatus for filling tubular casings with a pasty material, in particular gathered-together sausage cases with sausagemeat. The apparatus may comprise at least one filling tube which is drivable and rotatable about its longitudinal axis and onto which a casing which can be filled with a material can be drawn. The filling tube at an end may be rotatably moveably mounted to a receiving portion and associated with the opposite open end may be a sausage case braking unit which can be brought into operative relationship with a casing which has been drawn over the filling tube. The embodiments of the invention further may further concern a filling machine for producing sausages of pasty material, in particular sausagemeat.

In an apparatus for filling tubular casings of the above-indicated kind, the embodiments of the invention attains an object by a support device which is arranged on the receiving portion and which has a support element for the filling tube, that is arranged at a spacing relative to the receiving portion in the longitudinal direction of the filling tube, wherein the support element is adapted to carry transverse forces acting on the filling tube.

The embodiments of the invention are based on the realization that, by means of the support device and its support element engaging the filling tube, which is arranged spaced, that is to say at a spacing, relative to the receiving portion and thus relative to the filling tube end mounted rotatably moveably on the receiving portion, a second mounting point for the filling tube is afforded. The filling tube is additionally supported by way of the support element in a region between the rotatably mounted end of the filling tube and the open end at which the pasty material issues, whereby transverse forces acting on the filling tube can be suitably carried. It is thus possible to prevent the filling tube performing a movement transversely relative to its longitudinal direction or the direction in which it extends, while a fresh tubular casing is being pulled over the filling tube or the open end of the filling tube is being brought into contact with the sausage case braking unit. In addition, it is possible with the support element to counteract sag of a central portion of the filling tube, caused by the inherent weight thereof, and thus avoid deformation, caused by centrifugal forces in the operation of twisting-off the sausage string. That markedly reduces the risk of a respective filling tube being excessively bent or indeed damaged so that, if at all, only minor deformation occurs on the filling tube, which does not adversely affect further use on the filling apparatus. This, therefore, preferably avoids premature replacement of the filling tube. In that case, the support device itself has a preferably rigid connection with the receiving portion of the filling apparatus. The support element preferably has a rotational mounting for the filling tube, thereby ensuring that the filling tube is mounted to the support element rotatably about the longitudinal axis of the tube. The rotational mounting is preferably in the form of a rotary bearing and directly supports the outside diameter of the filling tube.

In a preferred development of the invention, it is provided that the support element is moveable along the filling tube. That provides that the spacing of the support element relative to the receiving portion is variable so that the portions of the filling tube, at which the highest transverse forces act from time to time, can be supported by the support element in specifically targeted fashion. The support element is displaceable along the filling tube between two end positions. The first end position is near the receiving portion and thus near the end of the filling tube, which is arranged rotatably and drivably on the receiving portion. The second end position is near the open end of the filling tube. The term "near" in the present case preferably denotes a spacing relative to a respective filling tube end of ⅕ or less relative to the total length of the filling tube. The support element is preferably so controlled that it is positioned in the second end position near the open filling tube end when the gathered-together casing is pushed onto the filling tube.

The transverse forces which possibly act when the gathered casing is being pushed onto the filling tube, in particular at the open end, can thus be reliably carried by the support element which can be positioned there. Preferably, the support element is slidably mounted along the filling tube or in the longitudinal direction thereof. A preferred configuration of the embodiments of the invention provide that, at the open end of the filling tube, the support element, which can be positioned thereon, is automatically displaced in the direction of the rotatably mounted end of the filling tube when the gathered casing, also referred to as the gathered sausage case, is being pushed onto the tube, so that the spacing between the support element and the receiving portion for the filling tube decreases.

Preferably, a plurality of rotatable and drivable filling tubes are arranged on the receiving portion, wherein each filling tube is mounted by way of a support element which is arranged at a spacing relative to the receiving portion and thus relative to the rotatably mounted end of the filling tube. The use of a plurality of filling tubes provides a filling operation which is improved in terms of economy on the filling apparatus which is designed in accordance with the invention. At the moment at which a fresh tubular casing is pulled or pushed onto a filling tube, the filling operation can be implemented on the respective other filling tube, in respect of the casing which is being pulled on. Preferably, the filling apparatus at the receiving portion has two rotatably mounted filling tubes. To implement the rotary movement of the filling tubes on the receiving portion, a separate drive means is preferably associated with each filling tube. Due to the use of a support element which is preferably moveable along a respective filling tube, at each of the filling tubes, the second mounting point for the filling tubes, that is preferably in the form of a floating bearing, ensures that none of the filling tubes mounted drivably on the receiving portion is bent transversely relative to the longitudinal direction when a fresh tubular casing is being pulled on or when it is brought into contact with the sausage case braking unit. In addition, the filling tubes, which are stabilized with the support device, may be held in a precise position relative to the sausage case gripping device or the sausage case braking unit, which simplifies the operation of pushing or pulling a fresh, tubular casing onto the tube and/or bringing the open end of a respective filling tube into contact with the sausage case braking unit. The mounting configuration by way of at least two mounting points for the filling tube also has the advantage that the filling tubes, even if they are slightly curved in the direction in which they extend, have a markedly reduced oscillation characteristic during the twisting-off process.

In a preferred embodiment of the invention, the receiving portion has a pivot plate which is held moveably to the apparatus and at which the filling tube is arranged preferably in horizontally projecting relationship. With the pivot plate being moveably mounted to the apparatus, it is easily possible for the filling tube onto which a fresh tubular casing is to be drawn to be moved from its filling position on the filling apparatus according to the embodiments of the invention, in which the filling operation for the tubular casing is usually effected. That provides an improved freedom of movement for, for example, a sausage case gripping device which is provided for drawing the tubular casing onto the respective filling tube. Preferably, the pivot plate has a plate plane on which the filling tube preferably perpendicularly projects. This provides a structurally simple mounting configuration for the filling tube with its end which is rotatably held on the receiving portion.

Preferably, the pivot plate has an axis of rotation, wherein the axis of rotation of the pivot plate and the respective axis of rotation of the filling tube are oriented in mutually parallel relationship. The fact that the axis of rotation of the pivot plate extends parallel to the axis of rotation of the filling tube provides for a pivotal movement, which is structurally simple to implement, of the filling tube on the filling apparatus. By virtue of a rotary movement which is simple to implement on the pivot plate about preferably its axis of rotation, a respective filling tube which is to be freshly fitted with a casing can be moved out of its filling position. The filling position is the position of the filling tube on the filling apparatus, in which the filling tube is brought into contact with the sausage case braking unit during the filling operation, wherein the filling tube is moved into a position in which there is an adequate freedom of movement for the sausage case gripping device which fits the tubular casing onto the filling tube. The pivot plate is preferably of a circular shape, the center line of which at the same time constitutes the axis of rotation of the pivot plate. The preferably two or more filling tubes on the pivot plate are uniformly spaced and are also arranged symmetrically relative to the axis of rotation of the pivot plate so as to provide for uniform distribution of mass of the filling tubes on the pivot plate. During the pivotal movement of the pivot plate with the drivable and rotatable filling tubes disposed thereon, this therefore provides for a uniform distribution of forces. In addition, by means of the support elements which additionally support the filling tubes, the filling tubes are also held in their predetermined orientation relative to the axis of rotation during the pivotal movement of the pivot plate so that the pivotal movement can be performed at a high speed without the risk of the filling tubes being caused to oscillate in such a way that permanent deformation and distortion occurs at the filling tubes.

Preferably, the support element has a guide slide moveable along a guide path of the support device, which guide path extends parallel to the longitudinal axis of the filling tube. With the use of a guide slide which is preferably carried slidably along a guide path of the support element, the support element can preferably be displaced along the filling tube whereby the spacing of the support element relative to the end of the filling tube which is carried rotatably and drivably on the receiving portion of the apparatus is variable or adjustable. Thus, the length of the receiving region on the filling tube for the tubular casing which is to be pushed or pulled onto the filling tube is adapted to be variable and permits individual adaptation to tubular casings for example of differing lengths. Preferably, the position of the support element on the filling tube can be adapted in dependence on the length of the casing which can be pulled onto the filling tube and/or the length, which varies during the filling operation, of the tubular casing which still remains on the filling tube.

A preferred embodiment of the invention provides that each guide path has two guide bars extending in mutually parallel relationship. The two guide bars, which are arranged in mutually spaced relationship and which are in the form of precision guide bars, ensure precise guidance for the guide slide of the support element along the guide path of the support device and, thus, positionally accurate alignment of the filling tube in coaxial relationship with the central axes thereof. In contrast to the use of only one guide bar, the use of two guide bars also has the advantage that the guide slide of the support portion is preferably guided in torsionally stiff relationship along the guide path of the support device. Preferably, the guide bars are of a cylindrical cross-section, but any other cross-section, like for example oval or also rectangular, is also possible. The guide bars preferably extend almost over the entire length of the respectively associated filling tube, whereby the support element can support almost any portion of a respective filling tube.

In another embodiment of the invention, the support device preferably has a central bar which is arranged coaxially relative to the axis of rotation of the pivot plate and on which the guide bars of a respective guide path are arranged to extend parallel. The use of a central bar and the guide bars extending parallel thereto provides a fixed, frame-like structure for the support device for the guide tubes arranged on the receiving portion of the apparatus, which at the same time affords a high level of structural strength. This, therefore, ensures precise orientation of the filling tubes relative to the pivot plate. The guide bars of a respective guide path for each support element are oriented parallel to the central bar of the support device whereby the moveably carried support elements are guided precisely and exact centering of the filling tubes, which otherwise are rotatably and drivably mounted only at one end, is ensured.

In a preferred embodiment of the invention, the ends of the guide bars are coupled at both sides to the central bar by way of a respective connecting flange, thereby guaranteeing a firm and thus secure connection to the central bar and positionally accurate orientation of the guide bars for the support elements relative to the central bar. The use of connecting flanges further ensures a structurally simple option in terms of the configuration of a strong frame-like structure for the support device, which can thus carry possible transverse forces acting thereon without the support device itself disadvantageously bending or twisting.

Preferably arranged at the free end of the central bar is a guide portion, which is moveable portion-wise along the central bar, of the sausage case braking unit. The guide portion engaging the central bar provides for a coupling between the support device and the sausage case braking unit, thereby providing for preferably exact orientation of the sausage case braking unit relative to the support device of the filling apparatus according to the invention. More specifically, the operation of pushing the sausage case braking unit onto a filling tube supported by a support device can therefore be implemented in a simplified and reliable fashion. The guide portion of the sausage case braking unit is preferably slidably displaceable along the free end of the central bar whereby the spacing between the sausage case braking unit and the filling tube can be altered so that changing of the filling tubes is then possible by preferably pivotal movement of the receiving portion on the filling apparatus according to the invention. Preferably, the guide portion remains permanently in contact with the free end of the central bar.

Preferably, each support element has a bearing portion, by way of which a sausage case entrainment ring is rotatably moveably mounted, which ring is respectively mounted non-rotatably on the filling tube and slidingly moveably along the filling tube. The rotatable mounting of the sausage case entrainment ring on the support element by way of, preferably, a rotary bearing affords a simple option in terms of providing a coupling between the support element and the filling tube without having to make a separate structural connection to the filling tube. The end of the gathered tubular casing which is pushed or pulled onto the filling tube is usually carried by way of the sausage case entrainment ring, which is part of the filling tube and at the same time fixed in the peripheral direction relative to the filling tube, being the end which is pulled first or in leading relationship onto the filling tube in the operation of pulling on the tubular casing. That ensures that the tubular casing is pressed against the outside of the filling tube not only at the open end of the filling tube or in the region of the tip thereof, but also the open end of the tubular casing, also referred to as the gathered sausage case, is brought into operative relationship with the filling tube in a positively locking or frictional engagement. Consequently, the tubular casing is preferably displaced in a rotary movement uniformly over its entire length when the filling tube is rotated through a predetermined angle for producing the separation or twist-off locations. This, therefore, prevents the ends of the tubular casing from being twisted relative to each other.

In a preferred embodiment of the filling apparatus according to the invention, it is provided that the support element is adapted to be moved in the direction of the receiving portion while the tubular casing is being drawn onto the filling tube, preferably by means of a sausage case gripping device. By virtue of the displacement of the support element with the sausage case receiving ring arranged rotatably thereon along the filling tube by the sausage gripping device, the support element can preferably be moved without its own drive along the filling tube in the direction of the receiving portion. In addition, forces acting transversely relative to the longitudinal axis of the filling tube, while the tubular casing is being drawn into the filling tube, are carried in the region by the support element, by such forces being produced directly by the sausage case gripping device which is preferably displaceable coaxially over the filling tube, on the filling tube. This, therefore, ensures that the filling tube is not excessively bendingly distorted when the gathered-together sausage case is being pulled on by means of the sausage case gripping device.

In another embodiment of the filling apparatus according to the invention, it is provided that the support element is preferably adapted to be displaced in the direction of the open end of the filling tube during the operation of filling the tubular casing, by means of a sausage case slider. With the sausage case slider, in particular during the operation of filling the tubular casing with the pasty material, the spacing of the support element relative to the receiving portion is increased in dependence on the currently prevailing length of the tubular casing on the filling tube, and thus the sausage case entrainment ring which is supported on the support element rotatably by way of the rotary mounting is altered or adapted in its position along the filling tube. That ensures that the gathered tubular casing, also referred to as the gathered sausage case, is only set to its original starting length at the open end especially by the sausage case braking ring arranged at the tip of the filling tube. The movement of the support element with its guide slide along the guide path of the support device by way of the sausage case slider has the advantage that the support element does not need its own drive to be displaced along the guide tube.

A further aspect of the invention concerns a support device for at least one filling tube of an apparatus for filling tubular casings with pasty material, in particular gathered sausage cases, with sausagemeat, which according to the embodiments of the invention is distinguished by a support element for the filling tube, which can be arranged at a spacing relative to a receiving portion which rotatably moveably receives the filling tube, in the longitudinal direction of the filling tube, and is adapted to carry transverse forces acting on the filling tube, and wherein the support device is adapted for use on an apparatus for filling tubular casings in accordance with one of the above-described preferred embodiments. Such a support device according to the embodiments of the invention with its preferably two support elements which can be arranged at a spacing relative to the receiving portion and thus at a spacing relative to the rotatably and drivably mounted ends of the filling tubes implements a second mounting point for the respective filling tube to be supported. Preferably, forces acting on the filling tube transversely relative to its longitudinal axis can be securely carried by the support element and in addition a respective open end of the filling tube can be oriented in positionally accurate relationship with a sausage case gripping device which is pushing the gathered-together casing onto the filling tube or relative to a sausage case braking unit which can be brought into operative relationship with the casing at the open end of the filling tube. Preferably, the support element is moveable along a guide path, extending parallel to the longitudinal axis of the filling tube, of the support device, wherein the support device can preferably be mounted rigidly to a receiving portion in the form of a pivot plate of a filling apparatus.

Advantageous developments of the support device according to the invention will be apparent from the foregoing description relating to the filling apparatus according to the embodiments of the invention and the preferred embodiments thereof. In that respect, attention is directed to the foregoing description.

The embodiments of the invention further relate to a filling machine for producing sausages from pasty material, in particular sausagemeat, comprising a filling hopper for receiving the pasty material, a conveyor pump for conveying the pasty material, and an apparatus for filling tubular casings with a pasty material, in particular gathered sausage cases with sausagemeat, as set forth herein and preferably at least one sausage case gripping device for gathered tubular casings like sausage cases or the like comprising two gripping elements which are held moveably relative to each other and which are mounted rotatably on at least one lever element.

Improved process reliability is afforded during the production of the sausages on a filling machine having a filling apparatus of that kind in accordance with the embodiments of the invention, due to the reduced flexural loading on the filling tubes. The risk of excessive bending distortion of the filling tubes transversely relative to the longitudinal axis thereof while the tubular casings are being pulled on or while being brought into contact with the sausage case braking unit at the open end of a respective filling tube is avoided with the support element which is preferably adapted to be displaceable along the filling tube. Advantageous configurations of the filling machine can be seen from the foregoing description relating to the filling apparatus according to the embodiments of the invention and the preferred embodiments thereof.

BRIEF DESCRIPTION OF THE SEVERAL VIEWS OF THE DRAWINGS

The invention is described in greater detail hereinafter by means of a possible embodiment by way of example with reference to the accompanying Figures.

DETAILED DESCRIPTION

Figure 1:
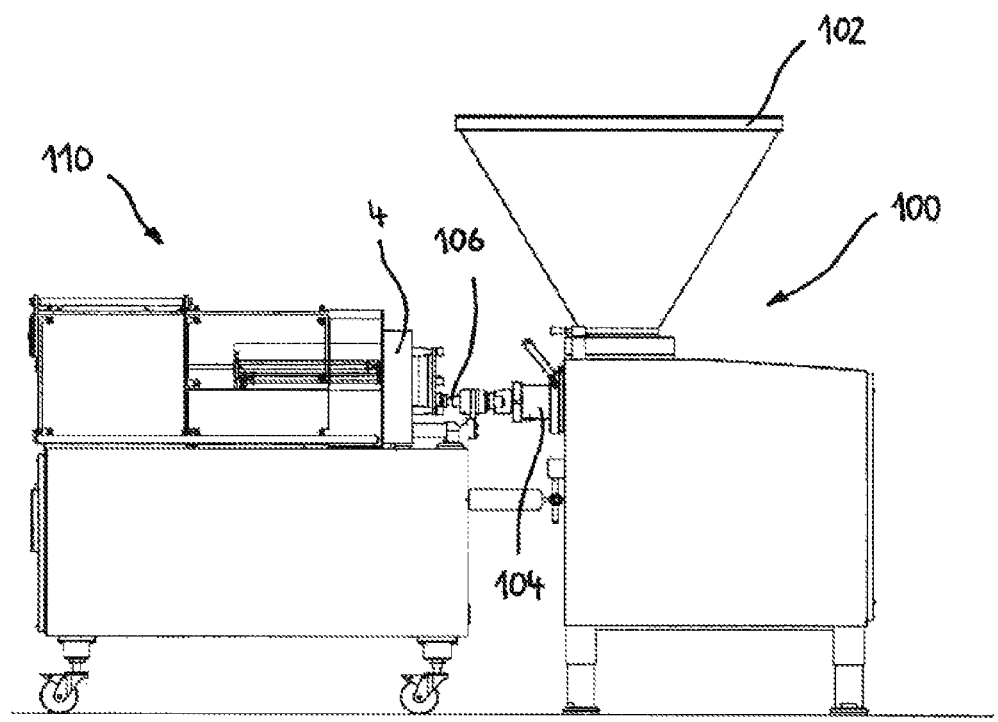
FIG. 1 shows a machine for filling tubular casings having a filling apparatus according to an embodiment of the invention.
Figure 2:
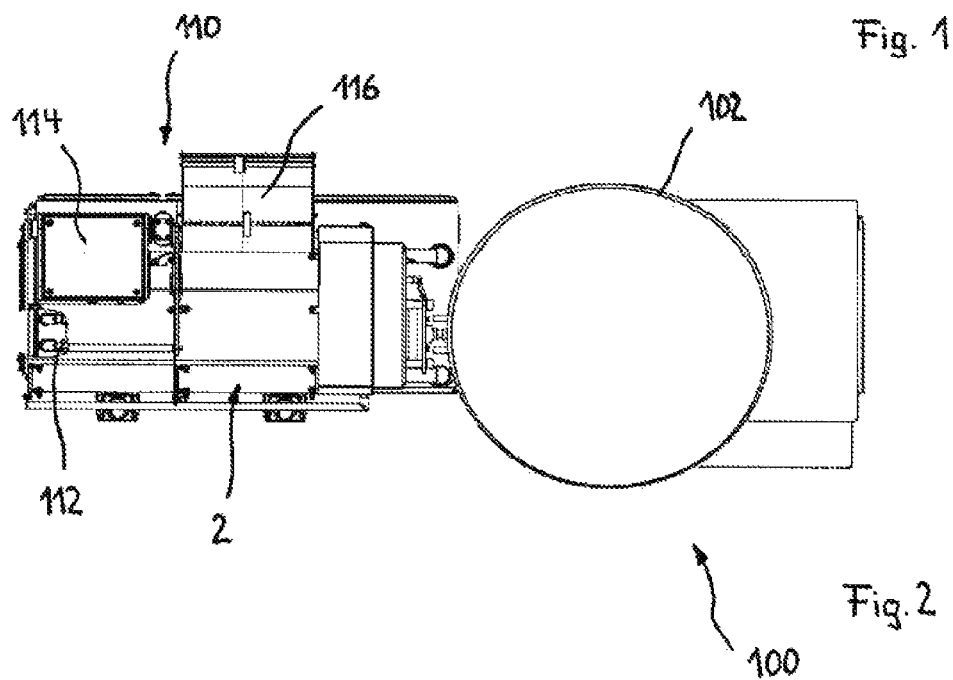
FIG. 2 shows a plan view of the filling machine and the filling apparatus according to the embodiment of the invention shown in FIG. 1.

FIGS. 1 and 2 show a machine 100 for filling tubular casings, in particular sausage casings, in conjunction with an upstream attachment device 110 to which a filling apparatus 2 and a sausage case gripping device 112 are mounted. The machine 100 has a filling hopper 102 and an extrusion head 104 which is connected in media-conducting relationship to a rotary turret magazine 4 of the filling apparatus 2 by way of a discharge tube 106. Also arranged on the attachment device 110 are a drive unit 114 and a magazine 116 stocked with a plurality of gathered sausage cases. The filling apparatus 1, the sausage case gripping device 112, the drive unit 114, and the magazine 116 are basically rigidly connected together on the attachment device 110 by way of a frame structure, wherein the individual components preferably have constituent parts or structural assemblies which is disposed moveably relative to each other.

Figure 3:
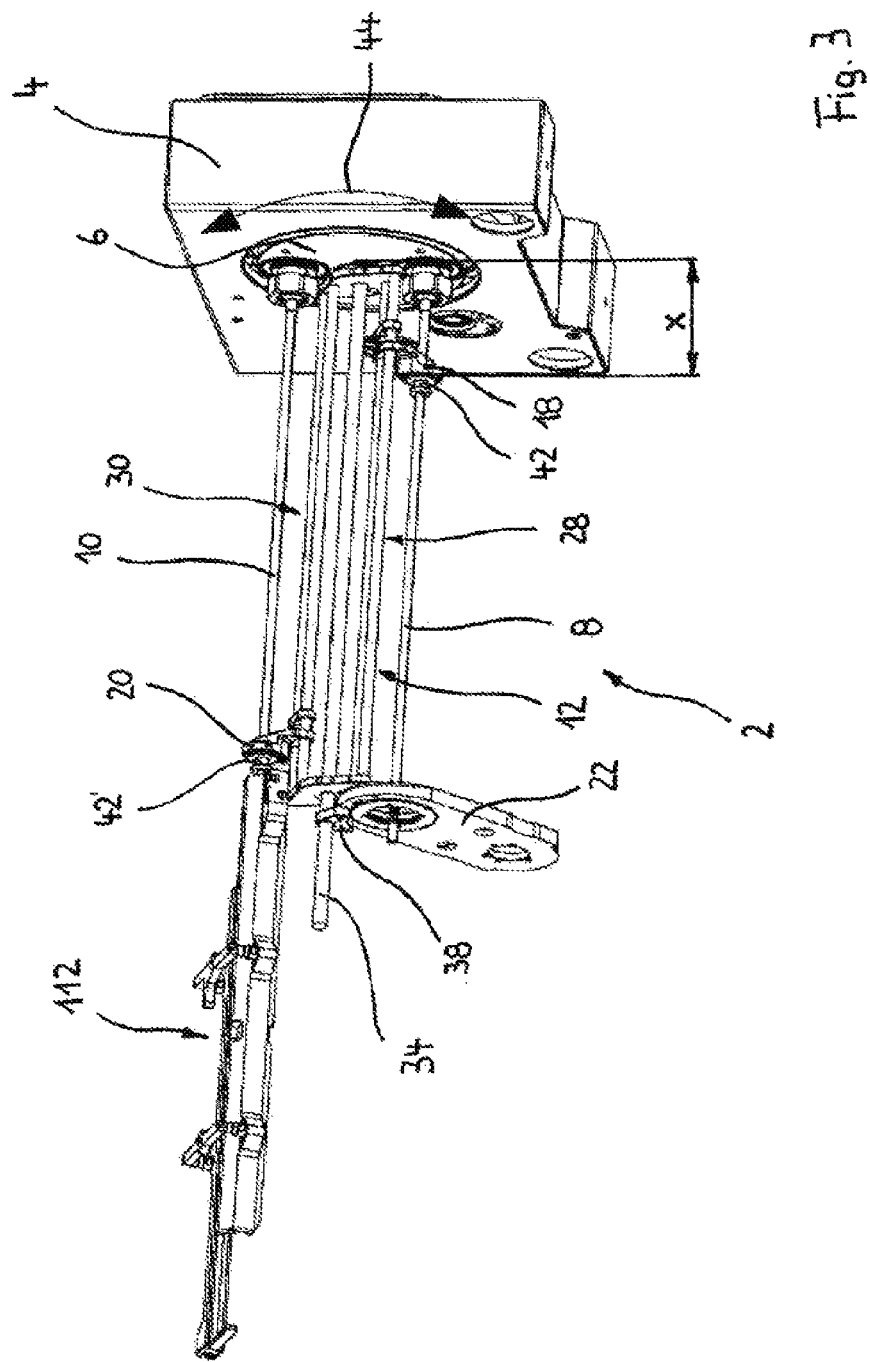
FIG. 3 shows a perspective view of a filling apparatus according to the invention and a sausage case gripping device coupled thereto for tubular casings.

FIG. 3 shows the filling apparatus 2 for filling tubular casings with a pasty material of, in particular, sausagemeat. The rotary turret magazine 4 has a rotatably carried receiving portion 6 for two filling tubes 8, 10, which are arranged rotatably and drivably on the receiving portion 6 and onto which a respective tubular casing which can be filled with the pasty material can be drawn. The receiving portion 6 is, in particular, in the form of a pivot plate with an axis of rotation oriented horizontally relative to the ground surface. Arranged on the receiving portion 6 is a support device 12 for the filling tubes 8, 10, which has, for each filling tube 8, 10, a support element 18, 20 which is arranged at a spacing, x, relative to the receiving portion 6 and thus relative to the rotatably moveably mounted end 14, 16 of each of the respective filling tubes 8, 10. Transverse forces acting on the filling tubes 8, 10 are reliably carried by means of the support elements 18, 20 and the filling tubes 8, 10 are thereby held in positionally accurate relationship with the axis of rotation thereof at least along a predetermined portion. Especially when the gathered sausage cases are being drawn onto the filling tubes and when a respective open end 14, 16 of a respective filling tube 8, 10 is brought into contact with a braking unit 22, the arrangement ensures that the filling tubes 8, 10 are no longer bent excessively transversely relative to their longitudinal axis, by virtue of the support device. The axis of rotation of the receiving portion 6 in the form of the pivot plate and the axes of rotation of the filling tubes 8, 10 extend parallel to each other and, in addition, the axes of rotation of the filling tubes 8, 10 are arranged uniformly spaced relative to the axis of rotation of the receiving portion 6. In that way, it is possible to relatively easily change the filling tubes 8, 10 between the various positions on the filling apparatus 2 in order to pull a tubular casing on the one filling tube 10 and, at the same time, implement the operation of filling the tubular casing on the other filling tube 8.

Figure 4:
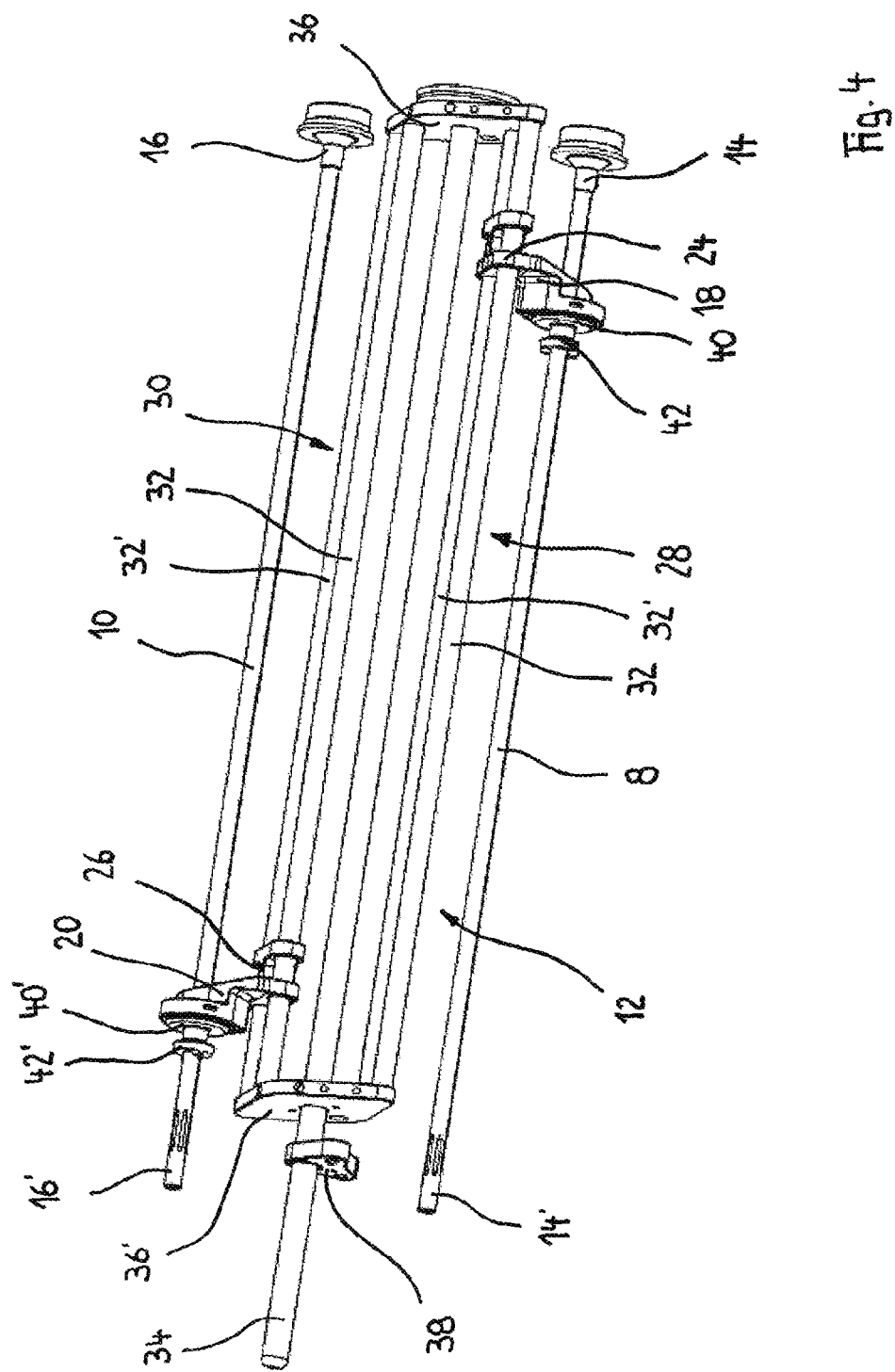
FIG. 4 shows a perspective partial view of the support device shown in FIG. 3 for supporting the filling tubes.

FIG. 4 shows a detail view of the support device 12, which is intended to clearly show the structure and function thereof. Each support element 18, 20 has a respective guide slide 24, 26 which is slidably moveable along a respective guide path 28, 30, extending parallel to the longitudinal axis of the filling tube 8, 10, of the support device 12, so that the spacing, x, of the support elements 18, 20 relative to the receiving portion 6 is variable. In that respect, each guide path 28, 30 is formed from two guide bars 32, 32' extending parallel to each other. The support device 12 also has a central bar 34 which is arranged coaxially relative to the axis of rotation of the receiving portion 6 and in relation to which the guide bars 32, 32' of a respective guide path are arranged to extend parallel. The guide bars 32, 32' are coupled at their ends to the central bar 34 by way of a respective connecting flange 36, 36' so that the support device 12 constitutes a strong frame structure.

As can be seen from FIG. 3, the free end of the central bar 34 of the support device 12 is coupled to a mounting means of a holding portion 38 of the sausage case braking unit 22 whereby the support device 12, in respect of its orientation transversely relative to the longitudinal axis of the central bar 34, is carried in a secured position with respect to the pivot plate 6 of the filling apparatus 2. The central bar 34 is, however, displaceable in the longitudinal direction in the mounting means of the holding portion 38. Each support element 18, 20 has a mounting portion 40, 40' which is in the form of a rotary mounting means for a sausage case entrainment ring 42, 42' which is carried slidably along the filling tube and by means of which it is ensured that the end of the tubular casing, which is pushed onto the filling tube, is kept in contact with the filling tube when producing the division locations between the individual portions of the sausage strings to be produced. Firm contact of the tubular casing during the filling operation at the open end 14' of the filling tube 8 is provided by way of a braking ring (not shown) of the sausage case braking unit 22. Preferably, the support elements 18, 20 are adapted to be displaced while the tubular casing is being drawn onto the respective filling tube 8, 10 by means of the sausage case gripping device 112 in the direction of the end 14, 16 of the filling tube 8, 10, that is mounted rotatably and drivably to the receiving portion 6, whereby the spacing, x, between the support element 18, 20 and the receiving portion 6 is increased, and during the operation of filling the tubular casing, by means of a sausage case slider (not shown) in the direction of the open end 14', 16' of the filling tube 8, 10 whereby the spacing, x, between the support element 18, 20 and the receiving portion 6 is reduced.

With the filling apparatus 2 according to the embodiments of the invention, the operation of drawing a tubular casing onto the filling tube 10 and filling a tubular casing which has been fitted on a filling tube 8 is performed as described hereinafter. As FIGS. 3 and 4 clearly show, the lower filling tube 8 is in the filling position for the tubular casing which has been drawn onto the filling tube but which is not shown here. At the open end 14' of the filling tube 8, a sausage case braking unit 22 is brought into contact with the casing which has been drawn onto the filling tube and, at the same time, the open end of the tubular casing is brought into contact with the sausage case entrainment ring 42 so that the casing which has been drawn onto the filling tube 8, upon a rotational movement of the filling tube 8 about its axis of rotation, performs the rotary movement involved uniformly over its entire length. With progressive filling of the tubular casing, the support element 18 is moved by way of a sausage case slider (not shown) in the direction of the open end 14' of the filling tube 8 so that the length of the tubular casing portion which has been gathered together on the filling tube gradually decreases. With the displacement of the support element in the direction of the open end, at the same time the second moveable mounting point is displaced in the longitudinal direction of the filling tube towards the open end 14' thereof whereby the filling tube 8 is securely supported. During the operation of filling, the tubular casing on the filling tube 8 at the same time a fresh, gathered casing portion is pulled on the upper filling tube 10 by means of a sausage case gripping device 112, shown in FIG. 3, over the open end 16' of the filling tube 10 in the direction of the rotatably and drivably supported end 16 of the filling tube 10. At the beginning of the operation of drawing on the tubular casing, which preferably takes place at the same time, the support element 12 is in its front end position in the region near the open end 16' of the filling tube 10, thereby ensuring that the filling tube 10 is oriented in positionally accurate relationship with the sausage case gripping device 112 and the tubular casing to be pulled thereover. Then, as the support element does not have its own drive, the support element 20 is displaced by the sausage case gripping device 112 along the guide bars 32, 32' in the direction of the receiving portion 6 in the form of the pivot plate. After the tubular casing has been pulled on by the sausage case gripping device, the latter moves back into its starting position.

After the filling operation on the filling tube 8 has been concluded, the sausage case braking unit 22 is pulled down from the open end 14' of the filling tube 8 in the longitudinal direction of the filling tube and then the receiving portion 6 in the form of the pivot plate is pivoted through about 180° (arrow 44) so that now the filling tube 10, which was previously in an upward position and which is now equipped with the tubular casing, is moved into the lower position and the empty filling tube 8 is then in the upper position. The pivotal movement of the pivot plate 6 with the filling tubes about the axis of rotation thereof can be implemented at high speed by virtue of the support elements 18, 20 which engage the filling tubes 8, 10 as the support elements counteract any swinging or oscillating movement of the filling tubes. After the change in position of the filling tubes has been effected, it is now possible to begin with the filling operation on the filling tube 10 and repeated pulling of the tubular casing onto the filling tube 8.

The invention claimed is:

1. An apparatus for filling tubular casings with a pasty material, the apparatus comprising:
   a receiving portion;
   a first filling tube configured to be drivable and rotatable about a longitudinal axis and on to which a tubular casing can be drawn, the first filling tube having a first end that is rotatably moveably mounted to the receiving portion and a second end opposite the first end; and
   a first support element for the first filling tube arranged at a first spacing relative to the receiving portion along the longitudinal axis of the first filling tube,
   wherein the first support element directly contacts and is configured to support the first filling tube and thereby carry transverse forces acting on the first filling tube.

2. The apparatus of claim 1 wherein the first support element is moveable along the first filling tube.

3. The apparatus of claim 1 further comprising:
   a second filling tube arranged on the receiving portion and configured to be drivable and rotatable about a longitudinal axis; and
   a second support element arranged at a second spacing relative to the receiving portion along the longitudinal axis of the second filling tube.

4. The apparatus of claim 3 wherein the receiving portion comprises a pivot plate held moveably to the apparatus and at which the first filling tube and the second filling tube are arranged in a horizontally projecting relationship.

5. The apparatus of claim 4 wherein the pivot plate has an axis of rotation, and the axis of rotation of the pivot plate, the longitudinal axis of the first filling tube and the longitudinal axis of the second filling tube are oriented in a mutually parallel relationship.

6. The apparatus of claim 5 wherein the first support element has a first guide slide moveable along a first guide path, the second support element has a second guide slide moveable along a second guide path, the first guide path extends parallel to the longitudinal axis of the first filling tube, and the second guide path extends parallel to the longitudinal axis of the second filling tube.

7. The apparatus of claim 6 wherein the first guide path has a first guide bar, the second guide path has a second guide bar, and the first guide bar and the second guide bar extend in a mutually parallel relationship.

8. The apparatus of claim 7 further comprising:
   a central bar arranged coaxially with the axis of rotation of the pivot plate and in relation to which the first guide bar and the second guide bar are arranged parallel.

9. The apparatus of claim 8 wherein respective ends of the first guide bar and the second guide bar are connected at both sides to the central bar by a respective connecting flange.

10. The apparatus of claim 8 further comprising:
    a guide portion arranged at a free end of the central bar, the guide portion moveable portion-wise along the central bar.

11. The apparatus of claim 10 wherein the first support element and the second support element each include a bearing portion and an entrainment ring rotatably moveably mounted to the bearing portion, the entrainment ring is mounted non-rotatably on the respective first filling tube or second filling tube, and the entrainment ring is slidingly moveable along the respective first filling tube or second filling tube.

12. The apparatus of claim 1 further comprising:
    a gripping device configured to move the first support element in the direction of the receiving portion while the tubular casing is being drawn on to the first filling tube.

13. The apparatus of claim 1 wherein the first support element is configured to be displaced toward the first end of the first filling tube during filling of the tubular casing.

14. The apparatus of claim 1 further comprising:
    a filling hopper configured to receive the pasty material; and
    a conveyor pump configured to convey the pasty material.

15. The apparatus of claim 14 further comprising:
    at least one gripping device configured to gather the tubular casing and additional tubular casings, the at least one gripping device including at least one lever element and a plurality of gripping elements which are held moveably relative to each other and which are mounted rotatably on the at least one lever element.

16. The apparatus of claim 1 wherein the receiving portion has a pivot plate held moveably to the apparatus and from which the first filling tube horizontally projects.

17. The apparatus of claim 16 wherein the pivot plate has an axis of rotation, and the axis of rotation of the pivot plate and the axis of rotation of the first filling tube are oriented in mutually parallel relationship.

18. The apparatus of claim 1 wherein the first support element has a first guide slide moveable along a first guide path, and the first guide path extends parallel to the longitudinal axis of rotation of the first filling tube.

19. The apparatus of claim 1 wherein the first support element includes a bearing portion and an entrainment ring rotatably moveably mounted to the bearing portion, the entrainment ring is mounted non-rotatably on the first filling tube, and the entrainment ring is slidingly moveable along the first filling tube.

20. The apparatus of claim 1 further comprising:
    a braking unit associated with the second end of the first filling tube, the sausage case braking unit configured to be brought into operative relationship with the casing which has been drawn over the first filling tube.

21. A support device for an apparatus for filling tubular casings with pasty material, the apparatus having a receiving portion and a filling tube rotatably moveably mounted to the receiving portion, the support device comprising:
    a support element having a mounting portion that directly contacts and is configured to support the filling tube for carrying transverse forces acting on the filling tube; and
    a guide path along which the support element is selectively positionable for adjusting a spacing of the support element relative to the receiving portion.

* * * * *